Patented Sept. 1, 1936

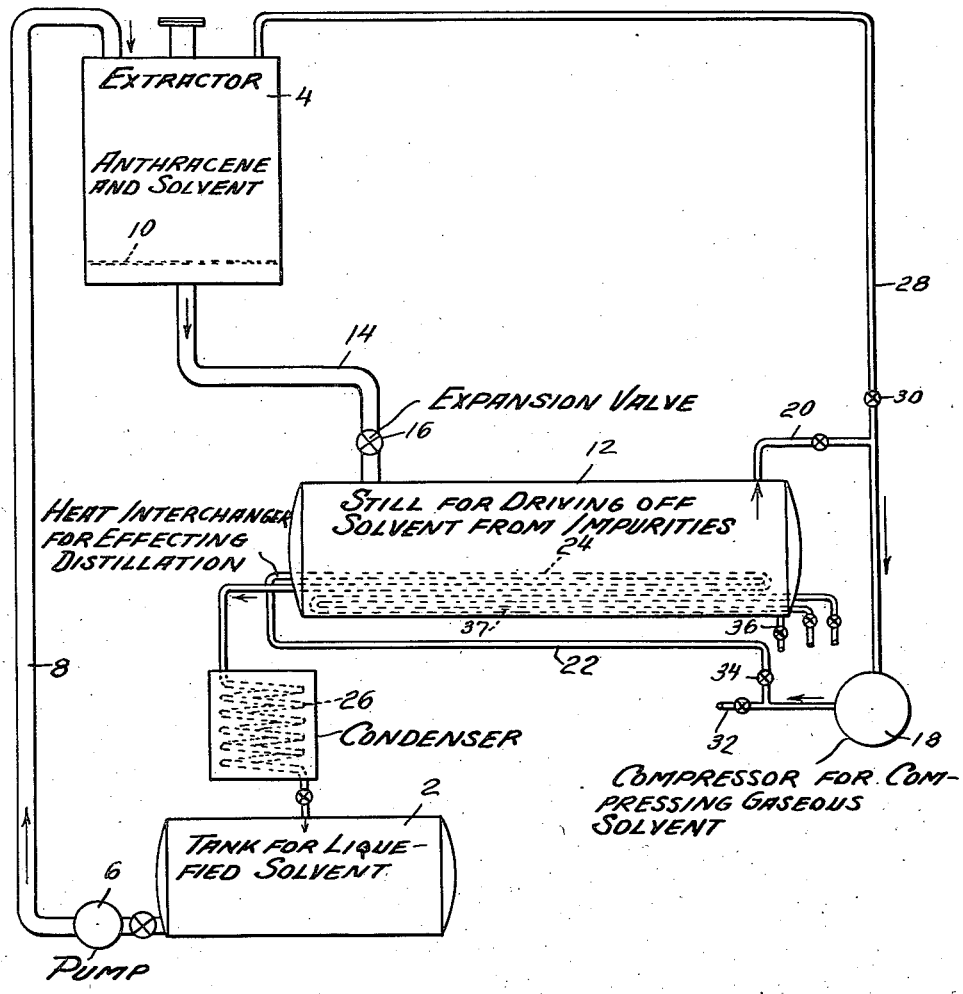

2,052,722

UNITED STATES PATENT OFFICE 2,052,722

PURIFICATION OF ANTHRACENE

Arthur H. Radasch, Bloomfield, N. J., assignor to The Barrett Company, New York, N. Y., a corporation of New Jersey Application October 28, 1932, Serial No. 639,969

1 Claim. (Cl. 260—168)

My invention relates to a process and apparatus for purifying materials by the selective action of a solvent and to the purification and recovery of the solvent thus used. My invention relates particularly to methods and apparatus for purifying and distilling solvents composed of highly volatile materials, including, for example, liquefied gases, to separate and recover such materials free from dissolved impurities and in a form suitable for re-use.

Methods have been described particularly adapted for purifying anthracene by the selective solvent action of liquid anhydrous ammonia. Liquefied ammonia containing dissolved impurities obtained in carrying out such processes may be purified by distilling the liquefied gas, leaving the impurities in the distillation apparatus, and obtaining substantially pure gas which is condensed to a liquid and returned to the cycle. Ordinarily in carrying out processes of this type, the liquefied gas is maintained under considerable pressure since it is generally more feasible to operate at atmospheric temperature with comparatively high pressure than at atmospheric or slightly higher pressure and at temperatures considerably below atmospheric. Furthermore, there is generally an increased solvent action of the liquid at normal atmospheric temperatures over that of the liquid when maintained at very low temperatures and under comparatively low pressures.

I have discovered that such processes and apparatus used in carrying them out can be improved and a substantial saving effected in the amount of heat required for distillation of the liquefied solvent by compressing the purified gas obtained in distilling the impure liquid and using its heat of condensation for distillation of solvent from the impure liquid. The hot compressed gases are cooled and condensed in whole or in part to liquid form.

Among the objects of my invention are to provide an improved method of purifying materials, to reduce the cost of purifying and recovering the solvent used in the process, to utilize heat produced in condensing hot compressed gas in effecting distillation of impure liquefied gas, and to reduce the cost of constructing and maintaining distillation apparatus for the purification of the liquefied gas. These and other objects and features of the invention will appear from the following description thereof in which reference is made to the drawing illustrating a preferred form of apparatus for carrying out the process.

Although my invention is hereafter described as applied to the purification of crude anthracene using liquid anhydrous ammonia as a solvent, it will be apparent that my invention is capable of wide application in treating highly volatile solvents including liquefied gases other than anhydrous ammonia, or sulfur dioxide, and may be used for purifying numerous materials other than anthracene.

In accordance with my invention when used in purifying crude anthracene by the selective solvent action of liquid anhydrous ammonia, the anthracene is introduced into an extractor capable of withstanding high pressure. The extractor is sealed and the apparatus evacuated to remove air therefrom. Ammonia under sufficient pressure to maintain the same liquid under the conditions of operation is then introduced into the extractor and into contact with the anthracene. The pressure of the ammonia in the extractor when operating at normal atmospheric temperatures is ordinarily about 100 to 200 pounds per square inch, although this pressure may be varied considerably as long as the ammonia used as a solvent is maintained in liquid form.

The ammonia and anthracene remain in contact until the impurities, such as phenanthrene, carbazol, and other solid and liquid hydrocarbons, have been dissolved to the desired extent, and the liquid ammonia containing dissolved impurities is then withdrawn from the extractor. Preferably, the introduction of liquid ammonia into the extractor and the removal of ammonia containing dissolved impurities therefrom is carried out continuously, maintaining a charge of liquid ammonia in contact with the anthracene during operation. The foregoing steps of the process may be the same as the corresponding steps of the process described in the copending application of Stuart P. Miller, Serial No. 639,968, now Patent No. 2,011,728, Aug. 20, 1935, if desired.

The liquid ammonia containing dissolved impurities removed from the anthracene is passed through an expansion valve to a distilling apparatus. The expansion valve employed is adapted to maintain the necessary high pressure in the extractor while permitting the distillation apparatus to be operated under substantially lower pressure, i. e., a pressure substantially lower than 100 pounds per square inch or even at atmospheric pressures or under vacuum, and at a correspondingly low temperature.

In the distillation apparatus the impure liquid ammonia is distilled whereby substantially pure ammonia gas is produced and the impurities remain behind in the still. The ammonia gas thus produced is removed from the distillation apparatus and compressed, preferably to a pressure about equal to that applied to the liquid ammonia reservoir and extractor, say 100 to 200 pounds per square inch. In compressing the gas, the temperature thereof is raised and the heat of condensation available at the higher temperature is utilized in distilling the impure liquid ammonia, preferably by passing the compressed and heated gas in heat exchanging relation with the liquid ammonia in the distillation apparatus. This heat exchange causes the gas to be partially or wholly condensed and may also reduce its temperature. The gas may be further cooled in condensing apparatus to complete the liquefaction thereof and the condensate is returned to the liquid ammonia reservoir for recirculation and re-use in the purification of the anthracene.

By the foregoing process I eliminate or reduce to a small amount the necessity of using steam or external heat for distilling the impure liquid ammonia, although if desired additional heat may be supplied to the distillation apparatus to supplement the heat available after compressing the ammonia gas. This feature of my invention is of particular advantage when using liquid anhydrous ammonia or other substance having a low boiling point and high vapor pressure at the temperature under which the extraction process is carried out.

The process is not only applicable to the purification of anthracene by extraction with liquid ammonia, but to other methods of purification in which purification or separation of materials is effected by extraction with volatile solvents and in which the solvent may be removed as vapor, the vapor condensed by compression, and the heat of compression and condensation utilized to aid in the evaporation of solvent from the extract.

Among solvents which can be handled in this manner may be mentioned sulfur dioxide ($SO_2$), methyl and ethyl ethers ($CH_3OCH_3$ and $C_2H_5OC_2H_5$), acetone ($CH_3COCH_3$), and the like.

For example, crude anthracene may be purified according to my process by extraction with acetone, instead of with ammonia as described below, higher temperatures or lower pressures or both being employed as required by the higher boiling point of acetone.

The process herein described is preferably carried out in apparatus such as that shown in the figure of the drawing and hereinafter described. The apparatus shown in the drawing comprises a reservoir 2 in which is maintained a supply of solvent consisting of a substance which is normally gaseous or has a boiling point not greatly in excess of atmospheric temperatures, and which, under pressure, is in liquid form. The solvent is delivered to an extractor 4 by means of a pump 6 through pipe 8. The material to be purified, which is solid under the conditions of temperature and pressure maintained in the extractor, is supported on a screen 10 in the lower portion of the extractor. After sufficient contact of the solvent and the solid to be purified, the solution of solvent and impurities passes from the extractor 4 to the distillation apparatus 12 through the discharge pipe 14 in which is located an expansion valve 16 adapted to maintain the pressure in the extractor sufficiently high to prevent distillation or gasification of the liquid solvent therein. The expansion valve 16 also prevents the pressure in the extractor from being communicated to the distillation apparatus so that the pressure under which distillation of the liquid ammonia containing dissolved impurities is carried out is relatively low and may not exceed atmospheric pressure.

Ammonia gas filling tank 12 above the impure liquid ammonia is withdrawn from the distillation apparatus by a compressor 18 through pipe 20 and is compressed to the desired pressure, say 100 to 200 pounds per square inch. The compression of the gas causes the same to be heated and the hot compressed gas is passed through pipe 22, to a coil or other heat exchange device 24 located in the distillation apparatus in heat exchanging relation with the impure liquid ammonia to distill off ammonia from the impurities dissolved therein. The compressed ammonia gas is thus cooled, may be partially or wholly condensed by heat exchange with the impure liquid ammonia and is passed through cooling coil 26 to insure complete condensation of the ammonia to liquid form. The purified liquid ammonia is then returned to the reservoir 2 for recirculation and re-use in the cycle.

In the starting operation of the apparatus, the material to be treated is charged into the extractor and the extractor sealed. The apparatus is then evacuated to remove air from the system and for this purpose the compressor 18 may be employed for removing air from the extractor through pipe 28 controlled by valve 30, and from the distillation apparatus through pipe 20. The air withdrawn is discharged to the atmosphere through an exhaust vent 32. When the apparatus is evacuated, valve 30 and the vent 32 are closed and valve 34 in the line 22 leading to heat exchange device 24 and the valve in pipe 20 are opened. The pump 6 is then operated to supply the liquid solvent to the extractor 4. Preferably the supply of solvent to the extractor and the discharge of impure liquid containing dissolved impurities from the extractor is substantially constant and in amount to maintain a supply of the solvent in contact with the material being treated during operation. The material undergoing treatment may be agitated by any suitable means to insure better contact of material and solvent. The impurities remaining in the distillation apparatus after the solvent has been distilled off are drawn off through a drain 36. The gas produced by distillation is withdrawn by compressor 18 and compressed, and the resultant heated gas passed therefrom to the coil 24 where the compressed gas gives up heat to the impure solvent, distilling the same and being thereby cooled and condensed. The condensate and any remaining uncondensed gas pass from heat exchanger 24 through the cooling coil 26, the resultant purified liquid extracting medium being returned to the reservoir 2.

An auxiliary steam coil 37 may be provided in the distilling apparatus to make up heat losses from the system and aid in the distillation of the ammonia or other extracting medium when the heat of condensation of the ammonia gas or other extracting medium in the coil 24 is insufficient to vaporize the ammonia from the impurities in still 12. For example, at the end of the distillation cycle, it may be that the heat of condensation of the ammonia gas in the coil 24 is insufficient to vaporize the ammonia and the impurities in still 12, and to supply the necessary heat, steam coil 37 may be utilized. It will be understood, however, that the major portion of the heat required to distill the ammonia from the impurities comes from the heat of condensation of the ammonia by indirect heat exchange between the hot compressed ammonia gas in coil 24 and the liquid in still 12. The steam coil 37 may also be employed in the heating up and melting of the impurities in the still and assisting in their removal from the still.

My invention is adapted for use in the treatment of liquefied gases other than those used as solvents, and the process may be carried out in apparatus other than that herein shown and described. It should, therefore, be understood that the foregoing description is intended to be illustrative and is not intended to limit the invention.

The term "liquefied gas" as used in this specification is intended to include highly volatile solvents in liquid form, examples of which are given above.

I claim:

The method of purifying crude anthracene which comprises introducing anthracene to be treated into an extractor, evacuating said extractor, sealing the extractor and continuously introducing liquid anhydrous ammonia under a pressure of about 100 to 200 pounds per square inch into the extractor into contact with the anthracene to dissolve impurities from the anthracene, continuously removing liquid ammonia containing dissolved impurities from the extractor and passing the same to distillation apparatus maintained at a pressure substantially less than 100 pounds per square inch, distilling the impure liquid ammonia to separate substantially pure ammonia gas from the impurities dissolved in the liquid ammonia, compressing the ammonia gas thus produced whereby the gas is heated, passing the compressed and heated gas through a zone immersed in the impure liquid ammonia in the distillation apparatus to distill the liquid ammonia and cool the gas, condensing and collecting purified liquid ammonia thus produced and passing the liquid ammonia again into contact with the anthracene.

ARTHUR H. RADASCH.